INVENTOR.
WALTER E. HUBER
BY
Reuben Wolk
ATTORNEY

July 4, 1972 W. E. HUBER 3,674,322
ENDLESS TRACK
Filed July 9, 1970 2 Sheets-Sheet 2
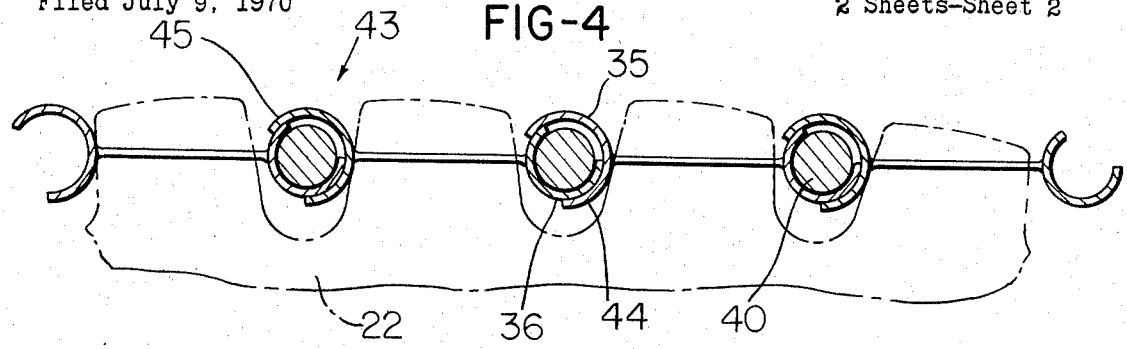
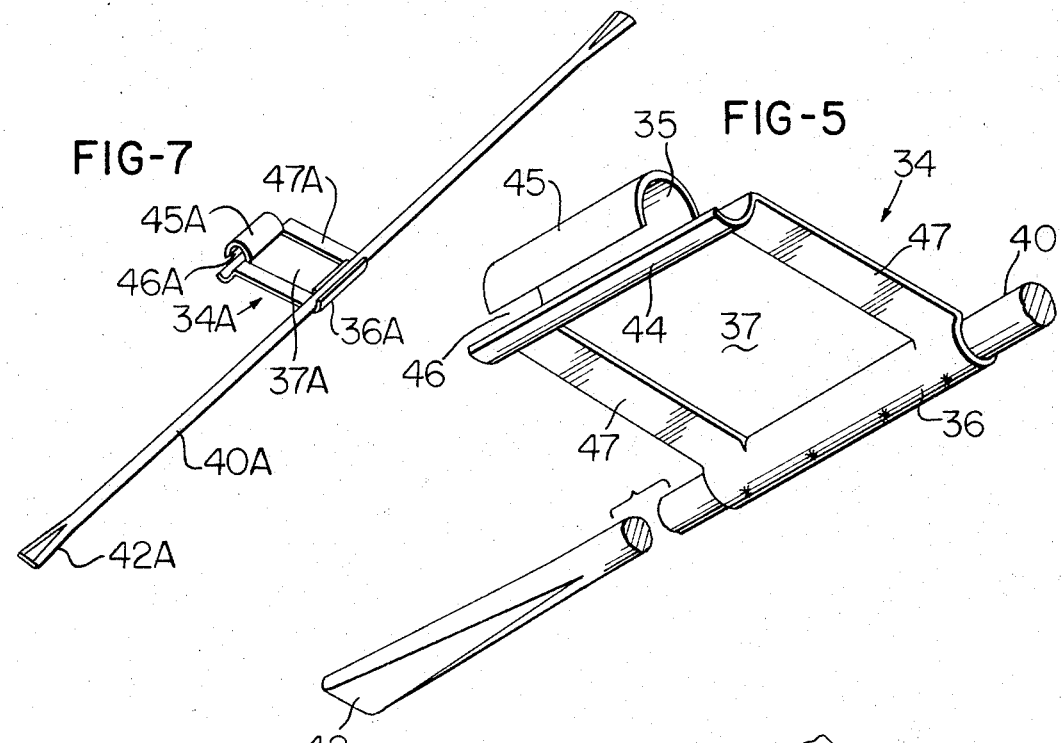
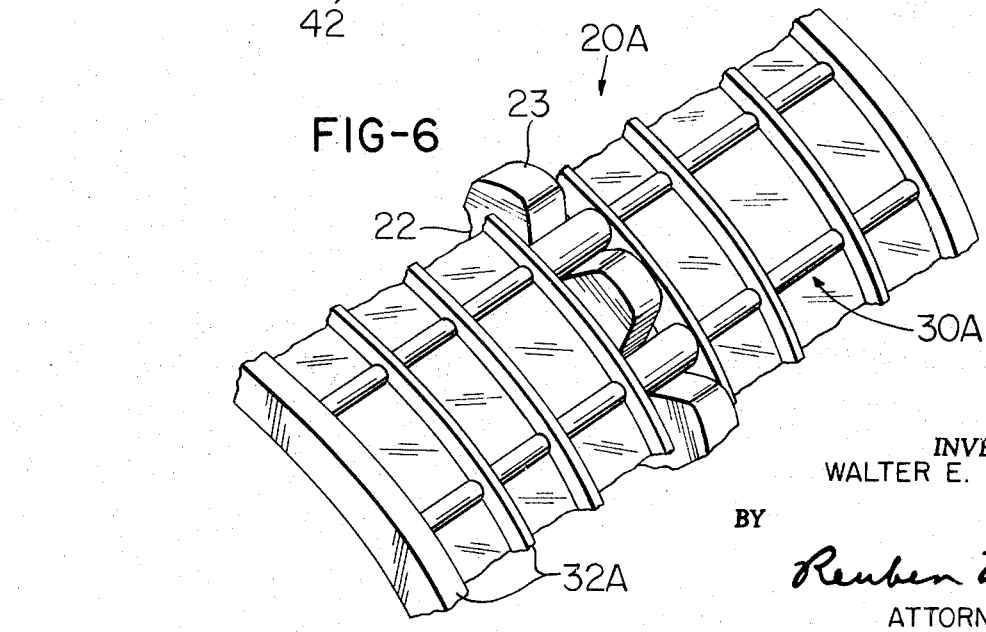
INVENTOR.
WALTER E. HUBER
BY
Reuben Wolk
ATTORNEY

United States Patent Office 3,674,322
Patented July 4, 1972

3,674,322
ENDLESS TRACK
Walter E. Huber, Springfield, Mo., assignor to
Dayco Corporation, Dayton, Ohio
Filed July 9, 1970, Ser. No. 53,608
Int. Cl. B62d 55/24
U.S. Cl. 305—38                                                12 Claims

ABSTRACT OF THE DISCLOSURE

An endless track is provided which has a substantially uniform width and is adapted to be moved in an endless path. The track is comprised of an elastomeric material and has at least one endless chain embedded within a band-like body which has a ground engaging surface and each endless chain is defined by a plurality of links having opposed interlocking end portions with each link having an opening therein which is adapted to receive therethrough an associated tooth of a drive sprocket used to drive the track. A plurality of reinforcing members are provided and each reinforcing member is fixed to an associated link and extends across the full width of the track whereby the reinforcing members provide optimum lateral stability for the track yet assure flexibility during movement thereof in its endless path.

BACKGROUND OF THE INVENTION

Endless traction belts or tracks have been proposed heretofore which use spaced endless chains comprised of interconnected links; however, these previous links are comparatively complicated and expensive. Further, previous endless tracks are deficient in that they do not provide optimum lateral stability as is required in using such tracks on tractors, snowmobiles, or the like.

SUMMARY

This invention provides an improved endless track of simple and economical construction which is particularly adapted to be used on a tractor, snowmobile, or the like. The track is comprised of a substantially uniform width band-like body made of an elastomeric material and has at least one endless chain embedded within the band-like body. The body has a ground engaging surface and each endless chain is defined by a plurality of links having opposed interlocking end portions with each link having an opening therein which is adapted to receive therethrough an associated tooth of a drive sprocket used to drive the track. A plurality of reinforcing members are provided and each reinforcing member is fixed to an associated link and extends across the full width of the track whereby the reinforcing members provide optimum lateral stability for the track yet assure flexibility during movement thereof in an endless path.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which

FIG. 4 is a view taken essentially on the line 4—4 of FIG. 3 and illustrating by dot-dash lines the position of the teeth of a sprocket wheel used to drive the endless chain of FIG. 3 and its associated endless track;

FIG. 5 is a perspective view with parts in cross-section and parts broken away, illustrating an individual link comprising one of the endless chain assemblies illustrated in FIG. 3 and particularly illustrating the manner of fixing a reinforcing member to one end portion of such link;

FIG. 6 is a fragmentary perspective view similar to FIG. 1 illustrating another embodiment of an endless track which utilizes a single endless chain which is embedded in position within the central portion of a band-like body whereby such track is driven by a single sprocket wheel; and FIG. 7 is a perspective view of a single link having a reinforcing member fixed to one end portion thereof and the link and reinforcing member of FIG. 7 is typical of the plurality of links and reinforcing members which are suitably interlocked and embedded in position to define an endless chain assembly comprising the endless track of FIG. 6.

DESCRIPTION OF ILLUSTRATED EMBODIMENTS

Figure 1:
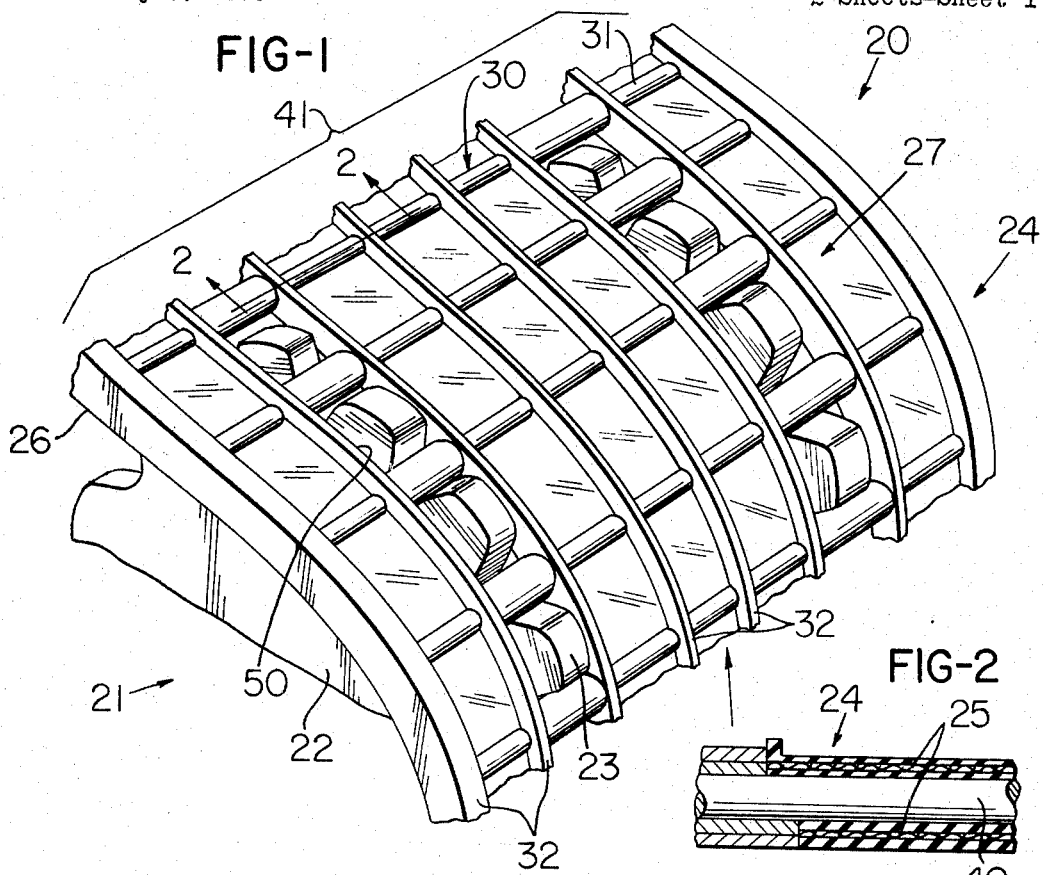
FIG. 1 is a perspective view, with parts broken away, illustrating one exemplary embodiment of an endless track of this invention being driven by a sprocket wheel assembly having a plurality of two sprocket wheels.

Reference is now made of FIG. 1 of the drawings which illustrates an exemplary endless traction belt or endless track of this invention which is designated generally by the reference numeral 20. The track 20 is particularly adapted to be used on a motor driven vehicle such as on a tractor, snowmobile, or the like, having a driving sprocket assembly 21 which includes a plurality of two sprocket wheels 22 each having a plurality of circumferentially equally spaced driving teeth 23 of standard construction.

Figure 2:
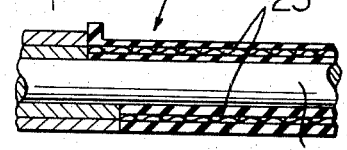
FIG. 2 is a cross-sectional view taken essentially on the line 2—2 of FIG. 1.

The track 20 may be made of any suitable materials and is comprised of a main band-like body 24, see FIG. 2, which is made of an elastomeric material such as natural or synthetic rubber, polyurethane, or the like, and such band-like body may include one or more layers 25 of reinforcing fabric suitably embedded in position therein. The track 20 has a substantially smooth inside or sprocket engaging surface 26 and a ground engaging surface 27 which is comprised of a plurality of equally spaced apart parallel cleats 30 and in this example each cleat 30 is comprised of a plurality of aligned sections 31 separated by parallel ribs 32 which extend longitudinally along the endless path of the track 20.

Figure 3:
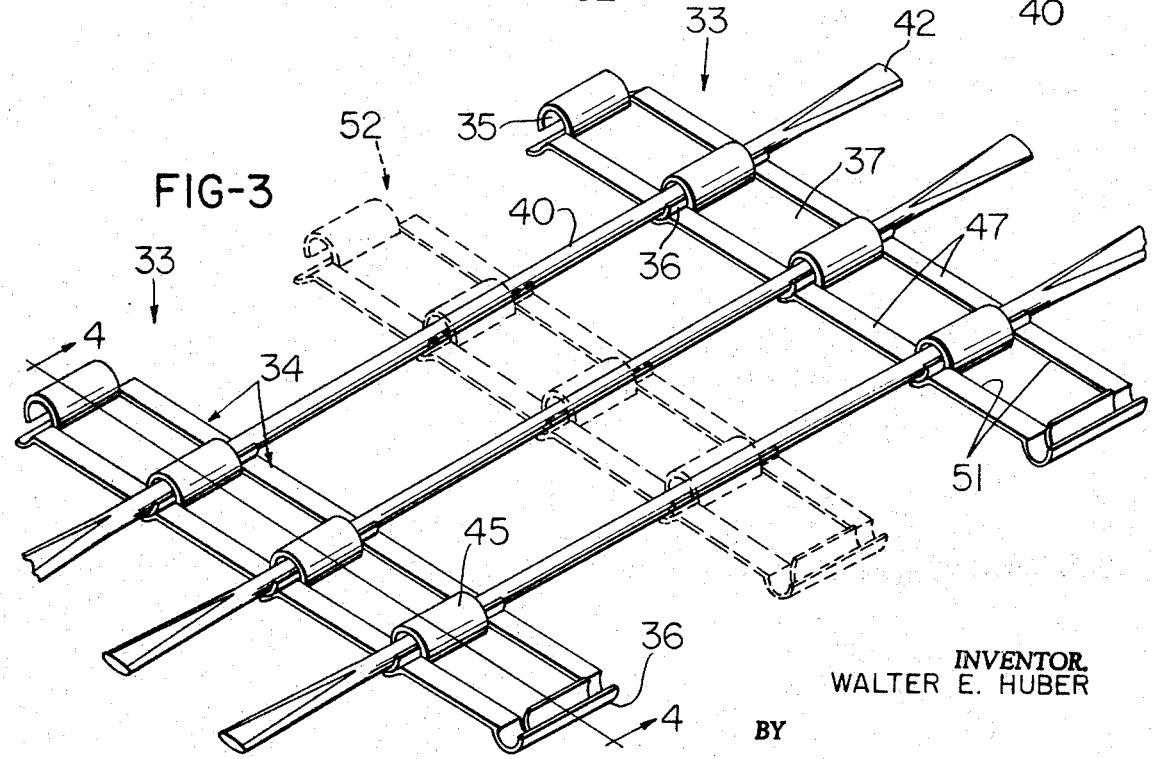
FIG. 3 is a perspective view illustrating by solid lines a portion of an endless chain assembly which is embedded within a main band-like body comprising the endless track of FIG. 1 and illustrating by dotted lines the manner in which another endless chain may be attached in position to provide a chain assembly which may be used in an endless track which is driven by a sprocket wheel assembly having a plurality of three sprockets.

The band-like body 24 has a major portion which is of substantially uniform thickness and each aligned section 31 of the cleats 30 has a substantially semicircular cross-sectional configuration and extends outwardly of the ground engaging surface 27. The track 20 has a pair of endless chains 33 fixed to its band-like body 24 by being suitably embedded therein. The chains 33 are comprised of a plurality of links 34, see FIGS. 3–5, having opposed interlocking end portions 35 and 36 and each link has an opening 37 which, in this example, is of substantially rectangular peripheral outline provided therethrough which is adapted to receive an associated tooth 23 of a drive sprocket wheel so that with the chains 33 suitably embedded within the elastomeric band-like body 24, the drive sprocket assembly 21 drives the chains 33 and, hence, the track 20 in its endless path.

The track 20 also has a plurality of reinforcing members each designated by the reference numeral 40 suitably embedded therein and each member 40 is fixed to one end portion of each link in any suitable manner and has an overall length which extends substantially completely across the full width 41 of the track 20 whereby such track has optimum lateral stability and the endless chains 33 enable the provision of an associated endless track to practically any desired length and as may be required for any application such as a tractor, snowmobile, or the like.

Each reinforcing member 40 may be of either solid or tubular construction and in this example of the invention each reinforcing member has a solid circular cross-sectional configuration throughout the major portion of its length. In addition, each member 40 has flattened end portions or ends 42 which further assure that once chains 33 with their reinforcing members 40 suitably fixed in position are embedded within the band-like main body 24 of the track 20 there is no likelihood that the members 40 will move axially. The endless chains 33 with members 40 fixed thereto define what may be considered an endless chain assembly 43, see FIG. 3, which is embedded in the main body 24 of the endless track 20.

The end portions 35 and 36 of each link 34 may be made to any suitable configuration and it has been found that each link 34 may be made with optimum structural integrity yet made with maximum economy by making end portion 35 in the form of a longitudinally slotted tubular configuration and end portion 36 so that it has a substantially semicylindrical configuration. The semicylindrical end portion 36 has a radius which is maller than the radius of end portion 35 and the wall thickness of each semicylindrical portion 36 is such that it is easily received within an associated end portion 35 and is rotatable therewithin. Because the links 34 comprising each endless chain 33 are identical, each chain 33 is readily assembled merely by assembling each smaller semicylindrical portion 36 within the larger radius portion 35.

The slotted and substantially tubular end portion 35 is defined by an arcuate (as viewed from an end thereof) portion 44 which has the same width as its associated link 34 and by an approximately semicylindrical portion 45 with a rectangular space or slot 46 being provided therebetween. The slot 46 has a thickness which is greater than the thickness of the link and for a purpose which will be apparent from the following description.

The assembly of a plurality of links 34 with members 40 fixed thereto to define the chain assembly 43 may be readily achieved merely by arranging the semicylindrical end portion 36 of an unattached link in axially aligned relation with the roughly tubular portion 35 of another link, sliding each portion 36 axially relative to an associated portion 35 so that one side portion 47 of the unattached link is moved axially along slot 46 until opposite side portions 47 of each link 34 are arranged outwardly of opposed ends of a semicylindrical portion 45 with portion 36 being arranged concentrically within portion 35. It will be appreciated that once an end portion 36 of one link has been thus overlappingly interlocked within an associated end portion of another link, the links are free to rotate relative to each other but cannot be axially pulled apart by pulling a pair of links in the opposite directions substantially parallel to the endless path. A reinforcing member 40 extends through the overlappingly interlocked end portions 36 and 45.

The end portion 36 extends through an arc which is at least 180 degrees, as viewed either in cross section or from an end thereof and may extend through an arc greater than 180 degrees. End portion 35 preferably extends through a comparatively large arc such as 270 degrees, for example, and in essence provides a sleeve-like bearing for an end portion 36 of an adjoining interlocked link.

By making the end portion 36 of each link 34 so that it extends through an arc of 180 degrees or greater and by making the end portion 35 so that it extends through an arc of roughly 270 degrees or more, it is virtually impossible to pull apart the links 34 of an endless chain 33 made using such links. In addition, each end portion 35 and 36 is made so that it has a constant radius whereby each link may be made using simple and economical manufacturing techniques.

Each link 34 is preferably made from any suitable metal and the end portion 35 of each link 34 is defined from a flat central strip of metal initially occupying a part of the space or opening 37. The central strip is merely formed in a direction opposite its original position and has a width which is equal to the width of the opening 37, see FIG. 5. The arcuate portion 44 of each end portion 35 has a width equal to the overall width of the link 34. Similarly, semicylindrical end portion 36 also has a width equal to the overall width of the link 34.

The endless chains 33 with the rods 40 fixed in position are embedded within the main body 24 of elastomeric material comprising the endless track 20 by any suitable technique known in the art and so that the openings 37 are open and capable of receiving the teeth 23 of associated sprocket wheels 22. In particular, the endless track 20 is formed so that the inside surfaces 50 of longitudinal ribs 32 either fully embed, by a small fraction of an inch, or are flush with associated inner side edges 51 of the links 34.

The endless track 20 shown in FIG. 1 has a plurality of two endless chains 33 comprised of interconnected links 34 having reinforcing members 40 fastened therebetween and extending across the full width 41 of the track 20 and such track is driven by a sprocket wheel assembly 21 having only two sprocket wheels. However, it will be appreciated that an endless track may be provided which may be driven by a sprocket wheel assembly having a plurality of three axially spaced sprocket wheels and associated teeth and with this latter type of endless track an additional endless chain will be fastened in position in the central portion of the chain assembly as indicated by dotted lines at 52 in FIG. 3.

It will also be appreciated that an endless track similar to the track 20 may be provided which has only a single continuous chain provided in the central portion thereof which may be driven by a single sprocket wheel 22 having associated sprocket teeth 23, as shown in FIG. 6 of the drawings. Because the endless track illustrated in FIG. 6 is similar to the track 20 it will be designated by the same reference numeral 20 followed by the letter designation A and corresponding components of the track will be designated by the same reference numeral as previously, also followed by the letter designation A and not described again in detail.

The main difference between the track 20A and the track 20 is that the track 20A is provided with a single endless chain and such endless chain is comprised of a plurality of interconnected links 34A, see FIG. 7, each having a reinforcing member 40A fixed to the small end portion 36A so that end portion 36A is fixed in the center portion of member 40A. The techniques used to assemble links 34A with reinforcing members 40A fixed in position and then mold the endless track 20A while suitably holding such links and members in position are substantially identical to the techniques used to make the belt 20 and are well known; thus, a detailed description thereof will not be presented.

Any suitable means may be used to fix the members 40 and 40A to their associated semicylindrical end portions 36 and 36A respectively; and, in this example of the invention such members are fixed by welding. However, it will be appreciated that such members may be fixed by using suitable adhesive means, by staking, or by forming each semicylindrical end portion firmly in position around and against an associated reinforcing member to firmly clamp such member in position.

While present exemplary embodiments of this invention, and methods of practicing the same, have been illustrated and described, it will be recognized that this invention may be otherwise variously embodied and practiced within the scope of the following claims.

What is claimed is:

1. An endless track having a substantially uniform width and being adapted to be moved in an endless path, said track comprising, a main band-like body having a ground engaging surface, an endless chain substantially embedded in said body, said chain being comprised of a plurality of one piece interlocking links having semicylindrical end portions, each of said links having an opening therein which is adapted to receive therethrough an associated tooth of a drive sprocket used to drive said track, each of said links having opposed end portions overlappingly interlocked with cooperating end portions of adjoining links, and a reinforcing member extending through said overlapping interlocked end portions and extending substantially completely across said width, said renforcing members providing optimum lateral stability for said track yet assuring longitudinal flexibility.

2. A track as set forth in claim 1 in which each reinforcing member comprises a rod-like member.

3. A track as set forth in claim 1 in which said body is made of an elastomeric material, each reinforcing member comprises a rod-like member having flattened end portions with each rod-like member being embedded in said elastomeric material, and said flattened end portions help hold said member against axial movement.

4. An endless track having a substantially uniform width and being adapted to be moved in an endless path, said track comprising, a main band-like body having a ground engaging surface, an endless chain substantially embedded in said body, said chain being comprised of a plurality of one piece interlocking links having semicylindrical end portions, each of said links having an opening therein which is adapted to receive therethrough an associated tooth of a drive sprocket used to drive said track, each of said links having opposed end portions overlappingly interlocked with cooperating end portions of adjoining links, and a reinforcing member extending through said overlappingly interlocked end portions and extending across said width, said reinforcing members providing optimum lateral stability for said track yet assuring longitudinal flexibility, said body being made of an elastomeric material, said endless chain and rod-like members being embedded in said elastomeric material with only parts of the interlocked end portions of said links exposed, and said opposed end portions of each link comprising a longitudinally slotted substantially cylindrical tubular portion at one end and a substantially semicylindrical portion at the other end having an outside radius which is smaller than the inside radius of said tubular portion, with each semicylindrical portion being interlocked within and rotatable relative to an associated tubular portion of an adjoining link.

5. A track as set forth in claim 4 in which each semicylindrical portion of each link extends through an arc of at least 180 degrees and each tubular portion extends through an arc of greater than 270 degrees.

6. A track as set forth in claim 4 in which each reinforcing member is nested within and fixed against the inside surface of an associated semicylindrical end portion of a link.

7. A track as set forth in claim 4 in which said tubular portion is defined by an arcuate portion which has the same width as an associated link and an adjoining approximately semicylindrical portion with a rectangular slot being provided between said arcuate portion and said adjoining semicylindrical portion.

8. A track as set forth in claim 7 in which each link is made of metal and the adjoining semicylindrical portion of each substantially tubular portion is made from metal initially occupying a part of the space defining said opening in the link.

9. An endless track having a substantially uniform width and being adapted to be moved in an endless path, said track comprising, a main band-like body having a ground engaging surface, an endless chain assembly substantially embedded in said body and being comprised of a plurality of spaced endless chains, each chain having a plurality of one piece interlocking links with semicylindrical end portions, with each of said links having an opening therein which is adapted to receive therethrough an associated tooth of a drive sprocket used to drive said track, each of said links having opposed end portions overlappingly interlocked with cooperating end portions of adjoining links, and a plurality of reinforcing members extending through said overlappingly interlocked end portions and extending substantially completely across said width, said reinforcing members providing optimum lateral stability for said track yet assuring longitudinal flexiblity.

10. A track as set forth n claim 9 in which each reinforcing member is fixed to corresponding end portions of associated links in each endless chain and each reinforcing member extends substantially perpendicular to said endless path.

11. A track as set forth in claim 10 in which each reinforcing member comprises a rod-like member.

12. A track as set forth in claim 10 in which said body is made of an elastomeric material, each reinforcing member comprises a solid rod-like member, and said endless chains and rod-like members are embedded in said elastomeric material with only parts of the interlocked end portions of said links exposed.

References Cited

UNITED STATES PATENTS

| | | | |
|---|---|---|---|
| 3,612,626 | 10/1971 | Fuchs | 305—38 |
| 3,285,676 | 11/1966 | Hetteen | 305—38 |
| 2,899,242 | 8/1959 | Bombardier | 305—38 |
| 2,040,696 | 5/1936 | Johnston | 305—37 |
| 2,914,360 | 11/1959 | Duclot | 305—38 |
| 3,477,767 | 11/1969 | McNeil | 305—38 |
| 3,282,630 | 11/1966 | Harrison | 305—38 |

FOREIGN PATENTS

| | | | |
|---|---|---|---|
| 824,043 | 9/1969 | Canada | 305—38 |

RICHARD J. JOHNSON, Primary Examiner